United States Patent [19]
Fox et al.

[11] Patent Number: 5,938,509
[45] Date of Patent: Aug. 17, 1999

[54] APPARATUS FOR ABRASIVE BLASTING OF SHIP BOTTOMS; METHOD AND APPARATUS FOR TESTING BLASTED SURFACES

[75] Inventors: Thomas J. Fox; Larry W. Ambrose; Kenneth G. Brown, Jr., all of Virginia Beach; George H. Curtis, III; Edward J. Ketz, Jr., both of Norfolk; Cheng Y. Lin, Virginia Beach; Frederick H. Porter, Portsmouth; Steven C. Wells, Norfolk, all of Va.

[73] Assignee: Center for Advanced Ship Repair and Maintenance, Inc., Norfolk, Va.

[21] Appl. No.: 08/679,869

[22] Filed: Jul. 15, 1996

[51] Int. Cl.$^6$ ........................................... B24C 3/06
[52] U.S. Cl. ........................ 451/91; 451/38; 451/92; 451/97; 324/701; 415/104; 415/354; 415/350
[58] Field of Search .................... 451/38–40, 37, 451/91, 99, 97, 102, 92, 354, 350, 87, 88; 73/53.01, 53.06, 64.71; 415/104, 107; 324/701, 425, 439, 464

[56] References Cited

U.S. PATENT DOCUMENTS

| | | | |
|---|---|---|---|
| 3,262,228 | 7/1966 | Schenck | 451/92 |
| 3,908,314 | 9/1975 | Watanabe et al. | 451/92 |
| 4,020,596 | 5/1977 | Bergh | 451/92 |
| 4,139,970 | 2/1979 | Hockett | 451/92 |
| 4,286,417 | 9/1981 | Shelton | 451/92 |
| 4,545,156 | 10/1985 | Hockett | 451/92 |
| 4,655,633 | 4/1987 | Somero et al. | 404/75 |
| 4,822,210 | 4/1989 | Oury et al. | 404/106 |
| 5,052,423 | 10/1991 | Chapman et al. | 134/174 |
| 5,279,078 | 1/1994 | Enegren | 451/38 |
| 5,423,415 | 6/1995 | Williams | 198/643 |
| 5,520,571 | 5/1996 | Brown et al. | 451/38 |

*Primary Examiner*—Robert A. Rose
*Assistant Examiner*—George Nguyen
*Attorney, Agent, or Firm*—Smith, Gambrell & Russell, LLP; Beveridge, DeGrandi, Weilacher & Young Intellectual Property Group

[57] ABSTRACT

Apparatus for abrasive blasting of the bottom of a ship in a drydock includes a blast head mounted on a vertically swinging boom on a vehicle. The blast head has freedom of movement about two pivot axes which are not parallel to each other. One of the pivot axes is coincident with the longitudinal axis of the boom. The center of gravity of the blast head is below the pivot axes when the blast opening normally faces upwardly. The boom and blast head are raised by double acting hydraulic cylinders which hold the blast head against the ship with a constant force. The blast head has a side edge which extends laterally at least to the side edge of the vehicle to facilitate blasting adjacent to obstacles under the hull. An overhung load adapter connects the blast wheel to its motor to minimize radial loads on the blast wheel motor. In the blast head, a stream of blasting material falling toward a main hopper is subjected to a transverse air stream which laterally deflects lighter particles into a debris channel. A diverter which defines a boundary between the main hopper and the debris channel is moved in response to changes in the inclination of the blast head to compensate for such changes. A chemical sampling device and method utilizes a sampling opening surrounded by a hull-engaging seal into which liquid is sprayed for chemical analysis.

19 Claims, 6 Drawing Sheets

APPARATUS FOR ABRASIVE BLASTING OF SHIP BOTTOMS; METHOD AND APPARATUS FOR TESTING BLASTED SURFACES

BACKGROUND OF THE INVENTION

This invention relates to apparatus for abrasive blasting of the bottom of a hull of a ship in drydock. It also relates to a method and apparatus for testing the blasted surfaces for soluble chemicals.

Ship's hulls require periodic cleaning due to corrosion, paint degradation, and incrustation with marine growth such as barnacles. Periodically, a ship must be drydocked, and its hull must be blasted and painted clean. This operation is very labor intensive and it is environmentally unsatisfactory.

There are two main types of drydocks. A graving dock is a sunken pit with doors. The ship is floated into the graving dock, the doors are closed, the ship is set on blocks, and the water is pumped out from the graving dock. The other type of drydock is a floating drydock which is initially sunken. The ship is positioned over the sunken drydock, and ballast water is pumped from the drydock to raise it until it supports the ship. In either case, the ship is eventually supported on a series of blocks which can range in height from 4.5 feet to 8 feet or more.

Normally the blasting of a ship bottom is performed by men who work under the ship with blast hoses. One man using conventional equipment will, in one hour, blast around 100 to 120 square feet and he will deposit close to one-half or three-quarters ton of abrasive on the deck of the drydock. Thus, there is a large quantity of abrasive material which must subsequently be removed from the drydock floor and taken to a disposal site. This is a slow and labor intensive process, and it creates a high potential for environmental pollution.

A number of problems are associated with the blasting procedure. Space is limited between the bottom of the ship and the floor of the drydock. The blocks are an impediment to personnel and equipment beneath the ship. Vast amounts of potentially harmful dust are generated, so other workers are excluded from the vicinity of the blasting procedure.

Prior to this invention, devices for blasting vertically downwardly or horizontally have been attached to cranes or tracks. These arrangements have had some success, but they have had significant limitations. One problem has been the difficulty of maintaining a constant supply of recirculated shot for blasting. When a blaster is moved, large amounts of dust are released, particularly when the blaster has been jolted by an obstacle so that sealing engagement with the ship has been lost. Large clusters and debris are released into the air.

There have also been efforts to mechanize the abrasive blasting of ship bottoms, but none have met with widespread commercial success. A unit designed by Wheelabrator Corporation around 1972 utilized a vehicle which traveled on a drydock floor, under the hull of a ship. Abrasive particles were directed upwardly by a blast wheel and recaptured in the unit, but the unit did not have the capability of following any non-horizontal sections, it did not utilize a diverter which was repositioned in response to tilting of the blast head, and, to the knowledge of the present inventors, it did not have other significant features which are the subject of the invention claimed herein.

A submarine hull blaster was developed in the early 1980's jointly by Wheelabrator Corporation and Barnes & Reinike. This system used a Wheelabrator blast head attached to a 50 foot articulating boom. The unit was designed to blast 180° of a 40 foot diameter circle. The unit was extremely large, heavy, and expensive, and it was incapable of blasting across the entire width of a ship's bottom.

Another system was developed by Hockett Systems SANDROID. It utilized complex and expensive robotic controls in order to manipulate a blast head mounted on a large industrial manlift. The vehicle was incapable of passing under a ship on five foot blocks in a drydock. The orientation of the blast head was achieved by sensors, computers, and servomotors, in contrast to the free pivot action which is used in the preferred embodiment of the present invention.

U.S. Pat. No. 4,092,942 discloses a machine particularly designed for blasting ship bottoms, but it does not utilize the concepts of the present invention. A hull-contacting "box", rather than the entire blast head was tiltable during the blasting procedure, there was no repositionable diverter in the recirculation path for abrasive, and other features of the present invention were lacking.

The apparatus of the invention recycles the abrasive material. There have been concerns that, when using recycled abrasives, some salt from the hull may be recycled onto the clean blasted steel surface where it may cause blistering or premature failure of the subsequent coating system. A major technical problem in this area has been that there has been no method of making real time measurements of the residual chloride concentration left on the blasted surface. One component of the present invention is a novel method and apparatus for making such measurements.

It is believed that the present invention satisfies a significant need in the art. The apparatus is compact and effective for performing its intended purpose. The operation of the abrasive recycling system is optimized due to an automatically repositioned diverter, and the blast head is properly positioned against the hull at a suitable orientation for effective blasting without the necessity of complex positioning devices and mechanisms. The device is able to blast extremely close to the hull-supporting blocks, the blast head motor is effectively protected by utilizing an overhung load adapter on the blast wheel shaft, the safety of the apparatus is enhanced by utilizing failsafe double acting hydraulic cylinders, and chloride measurement is effectively carried out simultaneously with the blasting operation.

SUMMARY OF THE INVENTION

This invention relates to apparatus for abrasive blasting of the bottom of a hull of a ship in a drydock. More particularly, the invention involves improvements in the type of apparatus in which a vehicle is movable on a drydock, a support assembly is mounted on the vehicle for supporting a blast head on the vehicle, and a blast head is mounted on and supported by the support assembly. The blast head has a blast wheel for impelling particles of abrasive particles through a blast opening against the hull of a ship, and particles are rebounded from the hull into the blast head.

One important feature of the invention is that the support assembly includes pivots which provide the blast head with freedom of movement about two pivot axes which are not parallel to each other, whereby the blast head is free to tilt to a position where the blast opening is parallel to an area of the hull which it faces. An actuator moves the blast head from an inactive position where it is spaced from the hull to an active position where it contacts the hull. This actuator is operable to exert a constant force on the blast head in the direction of the blast opening when the blast head is at its active position. The center of gravity of the blast head is below the pivot axes when the blast opening faces upwardly, so the blast head opening faces upwardly due to gravitational force when the blast head is not in its active position.

Preferably, the support assembly includes a vertically swingable boom which has a first end mounted on the vehicle and a second end connected to the blast head. The boom has a longitudinal axis which is coincident with one of the pivot axes of the support assembly. The actuator preferably is an hydraulic cylinder. There is an hydraulic pump, and an hydraulic conduit having an inlet connected to the hydraulic pump and an outlet connected to the hydraulic cylinder. A valve connected to the hydraulic conduit releases hydraulic fluid from the hydraulic conduit into a return line to maintain the hydraulic cylinder at a constant hydraulic pressure, whereby the hydraulic cylinder exerts a constant force when the blast head is at its active position. The actuator is a double acting hydraulic cylinder which utilizes hydraulic fluid to raise and lower the boom.

According to another feature of the invention, the vehicle has a side edge which is movable into proximity with obstacles such as hull-supporting blocks on a drydock floor, and the blast head has a side edge which extends laterally with respect to the vehicle at least to a vertical plane which includes the vehicle side edge.

Another improved feature of the invention involves the utilization of an overhung load adapter which connects an hydraulic blast wheel motor to the blast wheel to absorb radial loads exerted on the blast wheel during operation of the apparatus.

Another feature relates to a means for effectively operating the apparatus when its inclination changes during operation. In this regard, the blast head has an abrasive delivery channel which leads from the blast wheel to the blast opening, an abrasive capture channel for receiving blasting material which has rebounded from the hull, and a main hopper for holding a supply of blasting material which is supplied to the blasting wheel. The abrasive capture channel has an outlet which gravitationally releases a falling stream of blasting material into the main hopper. The falling stream of blasting material is subjected to a transverse stream of air which laterally deflects lighter particles from the stream of blasting material into a debris channel. A diverter has an exposed edge which is adjacent to the falling stream of blasting material to define a boundary between a path leading to the main hopper and a path leading to the debris channel. The exposed edge of the diverter is moved relative to the blast head in response to changes in the inclination of the blast head, to compensate for changes which occur in the path of the falling stream relative to the blast head when the inclination of the blast head is changed.

Still another feature of the invention relates to a chemical sampling device for use in the analysis of soluble materials on the hull. The sampling device is preferably mounted on the blast head. It has a chamber which has a sampling opening surrounded by a seal which engages the hull. A nozzle directs a liquid stream against the hull in an area surrounded by the seal. A sensor is provided for analyzing liquid which has struck the hull to determine chemical characteristics of soluble materials on the hull. A chamber outlet releases the liquid which has struck the hull.

In another respect, the invention involves a method of testing soluble chemicals on the hull of a ship. The method utilizes a device which has a chamber provided with a sampling opening surrounded by a seal. According to the method, the seal is placed against the hull, a stream of sampling liquid is directed from a nozzle against the hull in the sampling area surrounded by the seal, the sampling liquid which has struck the hull is received in the chamber, and this liquid is analyzed to determine the chemical characteristics of soluble materials on the hull.

It will be recognized that the invention may be practiced by a wide variety of machines. A presently preferred embodiment is disclosed in the description and in the drawings of this specification.

DESCRIPTION OF A PREFERRED EMBODIMENT

Figure 1:
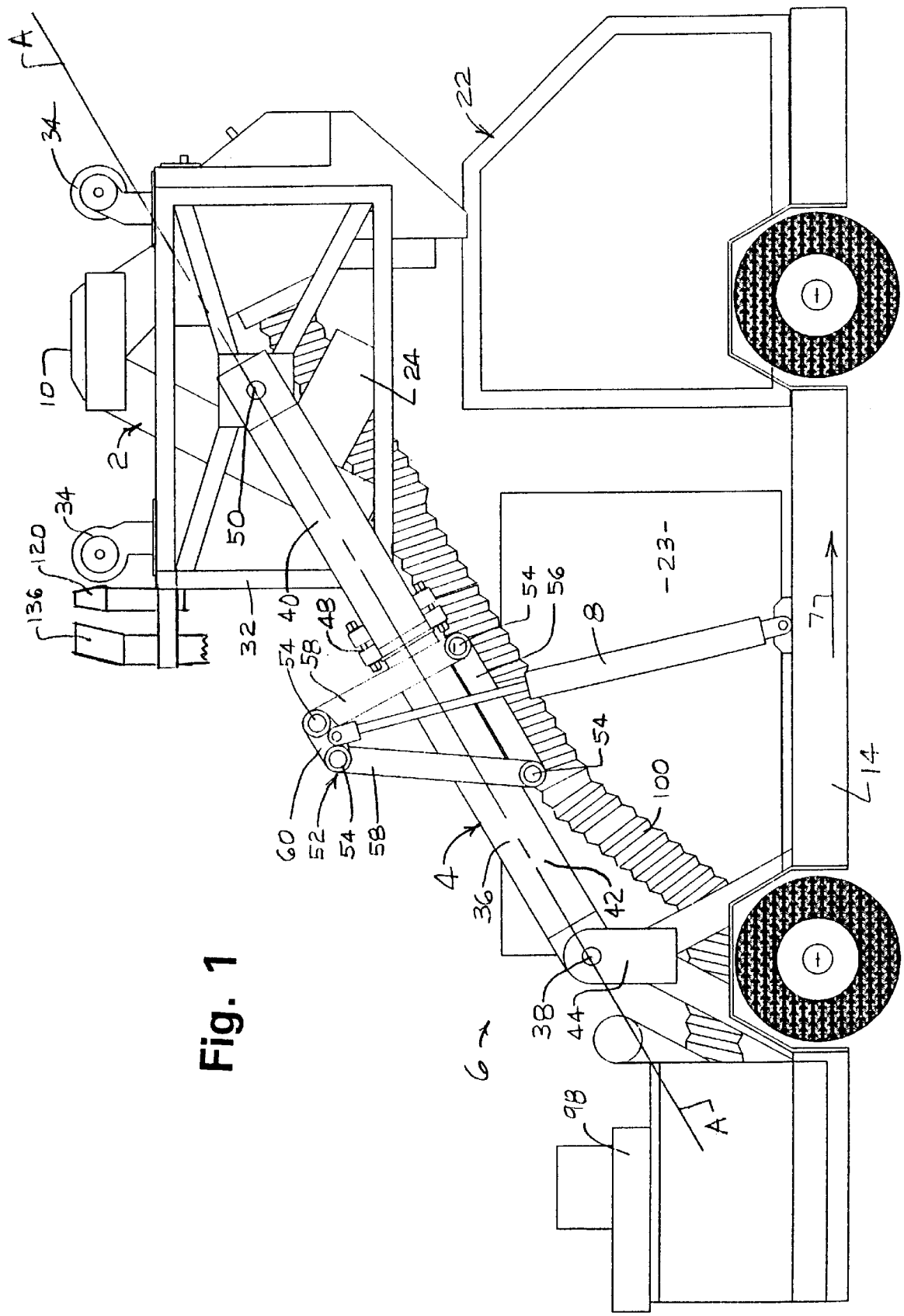
FIG. 1 is a side view of an apparatus according to the invention wherein the blast head is in its raised hull-contacting position.
Figure 2:
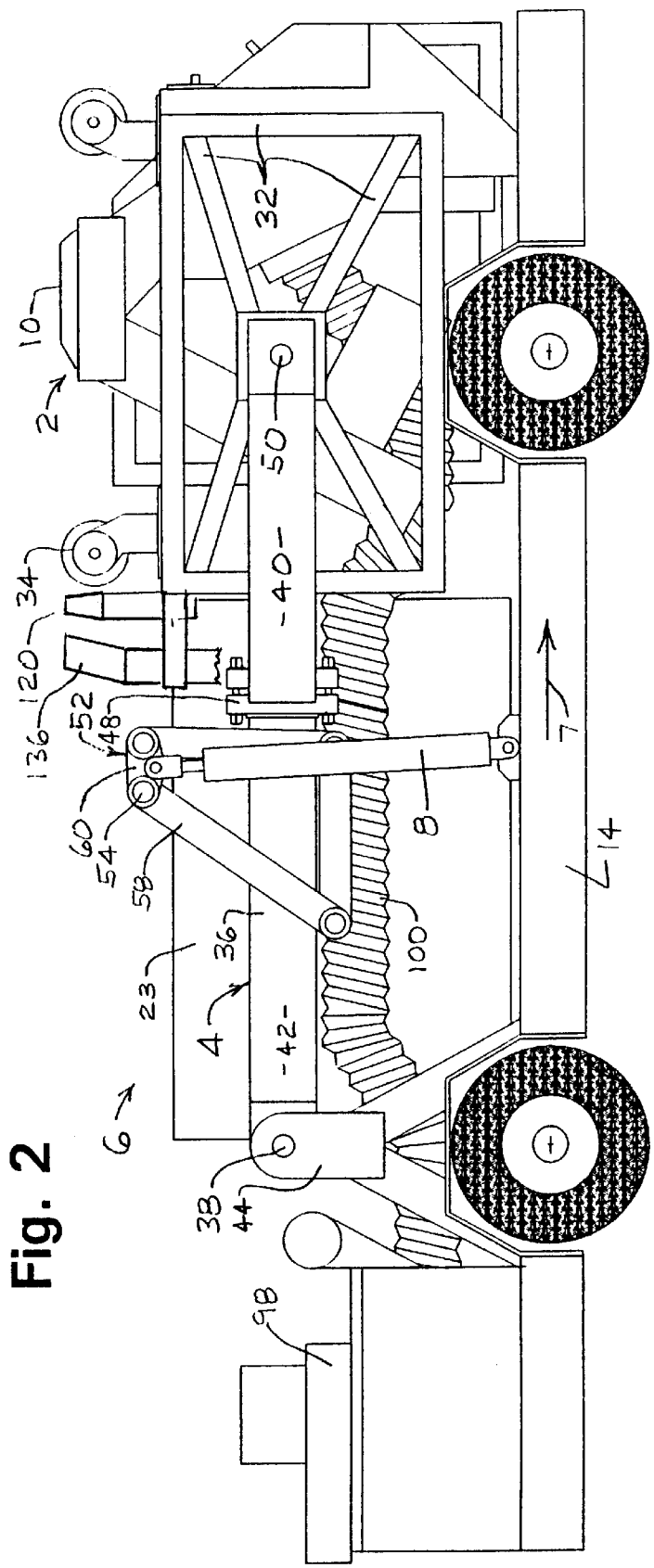
FIG. 2 is a side view of the apparatus, similar to FIG. 1 but showing the blast head in its lower transport position.
Figure 3:
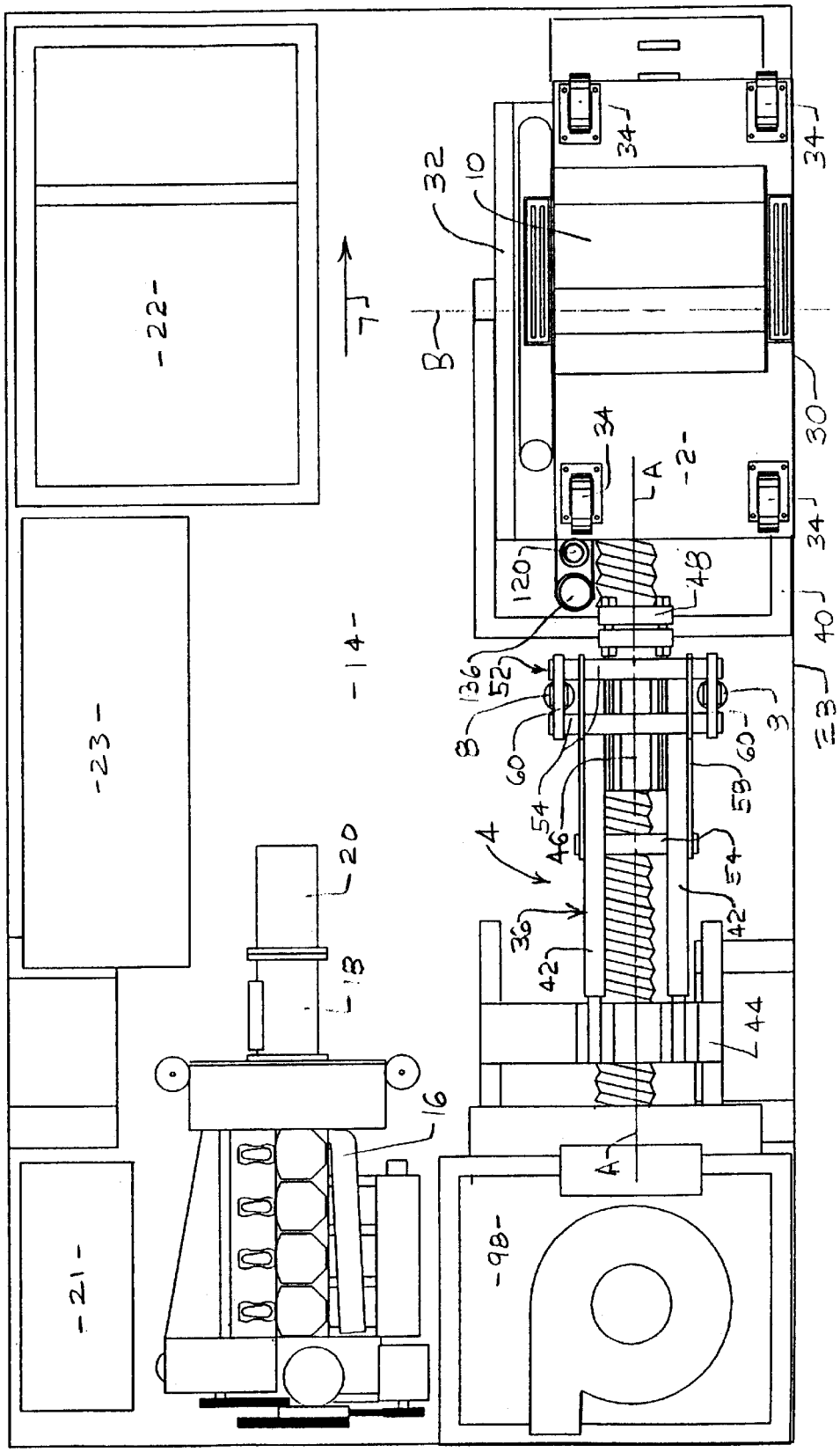
FIG. 3 is a plan view of the apparatus of the invention.

In the disclosed embodiment of the invention, and as shown in FIGS. 1–3, a blast head 2 is supported by a support assembly 4 on a vehicle 6 which normally travels on the floor of the drydock, beneath the hull of a ship which is being serviced. The normal forward direction of travel of the vehicle is indicated by the arrow 7. The blast head 2 is raised and lowered by an actuator which includes a pair of hydraulic cylinders 8.

Figure 4:
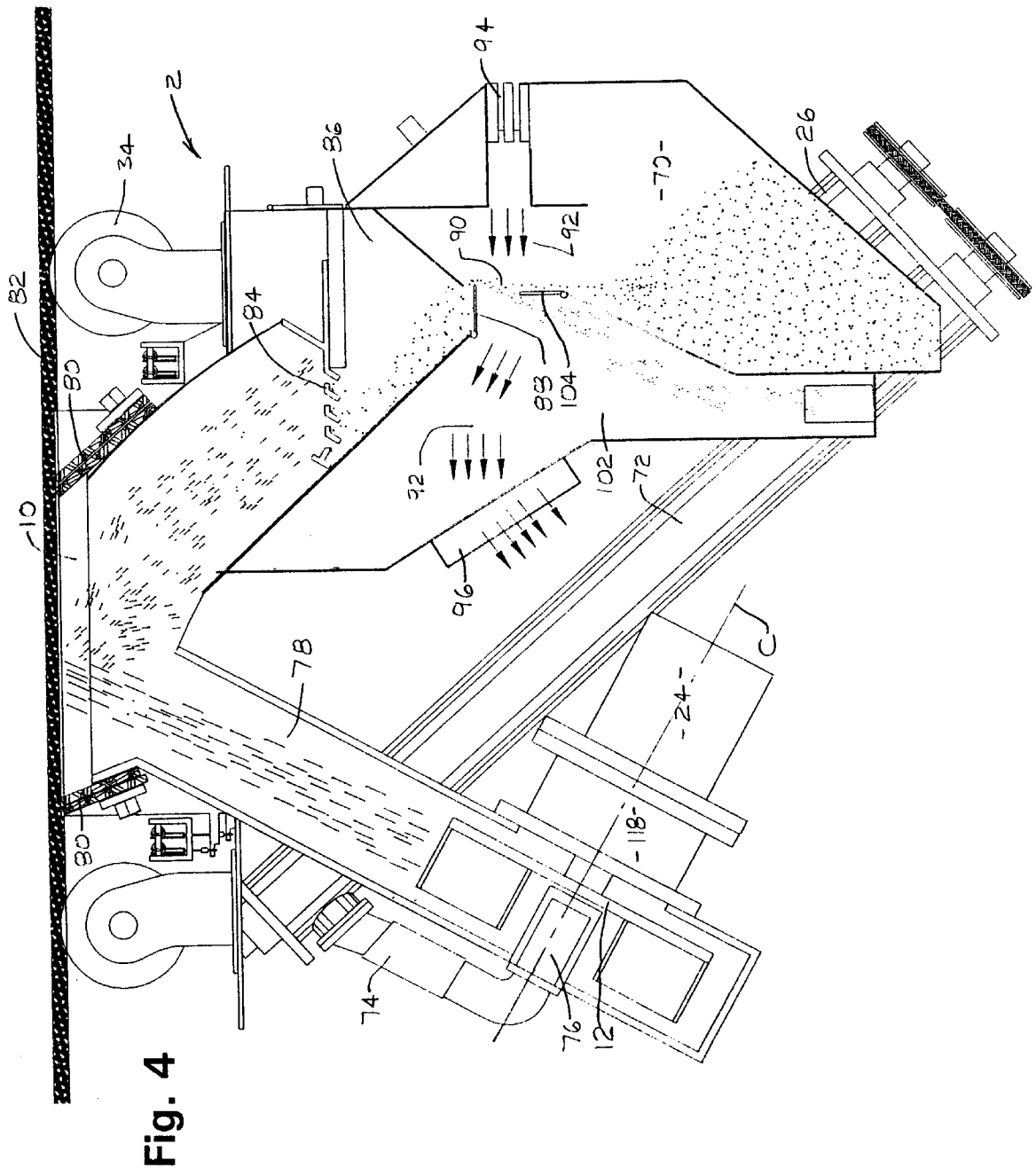
FIG. 4 is a sectional view of the working elements of the blast head, illustrating the paths followed by the abrasive particles and debris.

As will be explained in greater detail subsequently in this specification, and as illustrated in FIG. 4, the blast head 2 includes an opening 10 which is placed against the ship's hull, a rotary blast wheel 12 which impels abrasive material such as shot through the opening 10 against the hull, and a recirculation system which captures the rebounding abrasive material, removes debris, and recycles the abrasive material to the blast wheel.

The vehicle 6 includes a frame 14, an air cooled diesel engine 16 which drives hydraulic pumps 18 and 20, and an operator's cab 22. Tanks 21 and 23 are mounted on the frame 14 to carry diesel fuel and hydraulic fluid. The two hydraulic pumps 18 and 20, through appropriate conduits and control valves, operate various components including the hydraulic cylinders 8 which lift the blast head 2, four rotary hydraulic motors (not shown) which are connected to the four wheels of the vehicle, and two rotary hydraulic motors 24 and 26, shown in FIG. 4, which rotate the blast wheel and the auger of the blast head 2. Inside the cab 22, there are valve controls which enable the operator to control the flow of hydraulic fluid to and from the hydraulic motors and cylinders, for purposes of propelling and steering the vehicle, operating the blast head, and raising and lowering the blast head.

Ships in drydocks are normally supported by large blocks. To permit placement of the blast head opening 10 as close as possible to these blocks, the blast head 2 is positioned at one side of the vehicle 6. As shown in FIG. 3, the vehicle has a side edge 28 which is movable into proximity with objects such as the hull supporting blocks on the drydock floor. The blast head 2 has a side edge 30 which, in the illustrated embodiment, is coincident with a vertical plane which includes the vehicle side edge 28. The lateral extension of the blast head side edge 30 relative to the vehicle side edge 28 should be at least to the vertical plane of the side edge. In other words, the blast head side edge 30 is not laterally recessed with respect to the vertical plane of the side edge 28 of the vehicle.

The blast head 2 includes a box-like frame 32 which has four hull-contacting caster wheels 34, the running surfaces of which are substantially coplanar with the plane of the blast opening 10.

The blast head assembly 2 is supported on a vertically swinging boom 36 which has one end mounted on the frame for pivotal movement about a horizontal pivot axis 38, and another end provided with a yoke 40 which supports the blast head assembly 2.

The frame 32 of the blast head 2 is supported for universal movement on the boom 36 so that it may tilt to an orientation which corresponds with the orientation of the area of the ship hull upon which it is acting. At the orientation shown in FIGS. 1–4, the blast head opening 10 faces upwardly and lies in a horizontal plane.

As shown in FIG. 3, the boom 36 is formed of two beams 42 of rectangular cross section, each of which has one end connected by a pivot pin 38 (FIG. 1) to an A-frame 44 on the support vehicle 6. The other end of the boom 36 is vertically movable, and it is provided with a bearing 46 which has a cylindrical housing which is rigidly connected between the beams 42. A rotating shaft in the bearing 46 is rigidly connected to the blast head yoke by a bolted coupling 48. Thus, the yoke 40 and the blast head 2 are tiltable about a pivot axis A which is coincident with the longitudinal axis of the boom 36.

In the preferred embodiment, the universal mounting of the blast head is provided by the bearing 46 which supports the yoke 40 on the boom 36, and by pins 50 which support the blast head frame 32 on the yoke to provide freedom of movement about a transverse pivot axis B. The center of gravity of the blast head assembly is located below the pivot axes A and B so that the blast head opening will face upwardly due to gravitational force when the blast head is not in its active hull-engaging position.

The actuator for raising and lowering the blast head preferably includes a pair of double acting hydraulic cylinders 8 which are connected to the boom by a rigid cage 52 which is welded to the boom. The cage 52 is formed of four transverse tubes 54 and eight steel bars. At each side of the boom, the cage includes a lower horizontal bar 56 which lies parallel to the boom, two vertical bars 58, and an upper bar 60 to which the pin of the rod of one of the hydraulic cylinders 8 is pivotally attached.

The pivotal connections at the opposite ends of the cylinders 8 are located where they will provide a substantially vertical orientation of the cylinders throughout their full range of extension. The cylinders will not be inclined more than 30° from vertical. This provides a greater available force at the initiation of upward vertical movement, and it results in an upward force which is substantially constant at all elevations of the blasting head.

The cylinders 8 are arranged to exert a constant force against the blast head 2, whereby the blast head will also exert a constant force against the ship's hull when it is in its active position. Since the hydraulic cylinders 8 are of the double acting type, an extra safety measure is provided, inasmuch as the blast head and boom will not fall accidentally if there is a loss of hydraulic pressure.

Figure 7:
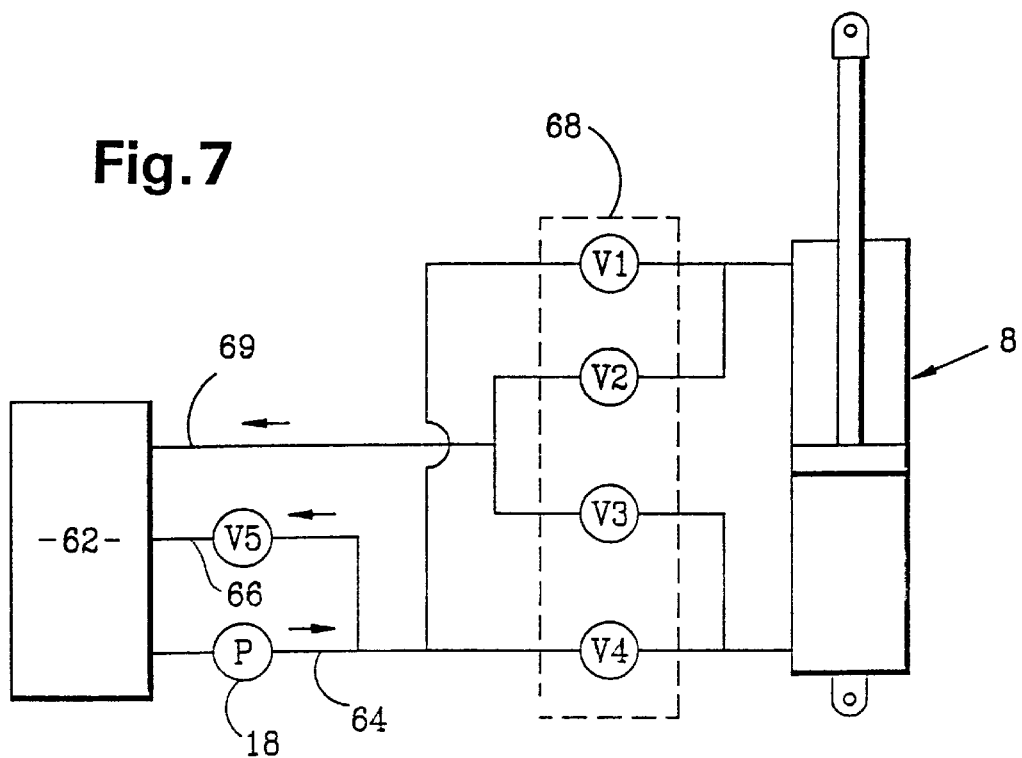
FIG. 7 is a schematic view of the hydraulic system used to raise and lower the blast head.

The hydraulic system for raising and lowering the blast head is shown diagrammatically in FIG. 7. It includes the pump 18 which supplies hydraulic pressure from a reservoir 62 to the cylinder 8. The pump 18 has an outlet conduit 64 which carries fluid to the cylinder 8. A return line 66 extends from conduit 64 back to the reservoir 62. A valve V5 in the return line 66 opens at a predetermined pressure to recycle fluid to the reservoir, thus maintaining the fluid delivered to the cylinder 8 at a substantially constant pressure. A control valve 68 with segments V1, V2, V3, and V4 controls the flow of fluid to and from the cylinder 8. At one position of the control valve, segments V2 and V4 are open, and segments V1 and V3 are closed, so hydraulic fluid at a predetermined pressure will extend the cylinder and fluid can return to the reservoir via the return line 69. At another position of the control valve, segments V1 and V3 are open, and segments V2 and V4 are closed, thus causing the cylinder 8 to retract.

The blast head 2 is an inverted version of a prior machine which has been modified by repositioning the motor, by providing an inclination-dependent diverter at the inlet end of a debris channel in the recirculation path, and in other respects.

FIG. 4 shows the main abrasive supply hopper 70 and an auger 72, belt-driven by motor 26, for lifting the abrasive particles and releasing them into a conduit 74, the outlet end of which opens to a control cage distributor 76 at the center of the blast wheel 12. The blast wheel 12 is rotated at a high velocity by an hydraulic motor 24 to impel the abrasive particles through a delivery channel 78 to the blast opening 10. Flexible seals 80 circumscribe the blast opening 10 and engage the hull 82 of the ship. After striking the hull, the abrasive particles rebound into a recirculation path which includes a deceleration screen 84 and a recapture hopper 86 in an abrasive return channel. The hopper 86 has an outlet gate 88 which is spring biased to a closed position, but sufficient weight of recirculated material on the gate 88 will open it partially so that it will release a falling stream 90 of blasting material into the main hopper 70. This falling stream is subjected to a transverse stream 92 of air flowing from air inlet 94 to air outlet 96. The transverse air flow is produced by an exhaust blower on a dust collector 98 (FIG. 1) which is connected by a flexible conduit 100 to the air outlet 96. Inside the blast head, the air stream 92 captures dust and paint chips which then become airborne and are carried through conduit 100 to the dust collector 98. The air stream 92 laterally deflects, toward a debris channel 102, light abrasive particles in the falling stream. These lighter particles are pieces of abrasive which have been broken into smaller particles which are unsuitable for subsequent use.

A diverter 104 with a movable exposed edge is positioned at the inlet to the debris channel 102. Such diverters have been used in prior downblasting machines, but they have not been automatically repositioned in response to changes in the inclination of the blast head as will be described below.

When the apparatus travels over the lower surfaces of the hull, its inclination will vary from time-to-time. Such variations in inclination will affect the location of the path of the falling stream 90 with respect to the structural components of the blasting head. To achieve uniformity in the material which is delivered to the main hopper 70, the diverter 104 is moved automatically. Its exposed edge is moved relative to the blast head in response to changes in the inclination of the blast head. This compensates for changes which occur in the path of the falling stream 90 relative to the blast head when the inclination of the blast head is changed.

Figure 5:
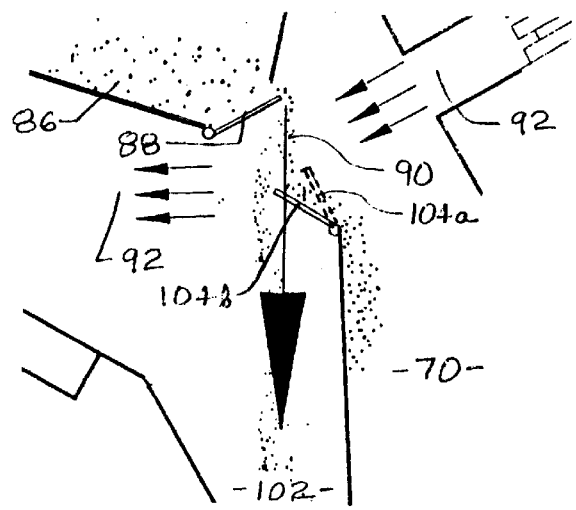
FIG. 5 is a schematic view which illustrates the purpose and the significance of the automatically repositioned diverter in the recirculation path of the abrasive material.

To illustrate this principle, FIG. 5 shows portions of the blast head when it has tilted 30 degrees to the left from the level orientation shown in FIG. 4. If the diverter stayed at the position shown in broken lines 104*a* which it had occupied when the blast head was level, the reusable abrasive particles and the debris would all fall into the debris channel 102. The main hopper 70 would soon become empty to interrupt the blasting process, and reusable abrasive material would be lost. According to the present invention, the diverter is tilted leftward in response to the tilting of the blast head, to the position 104*b* shown in solid lines in FIG. 5. This catches the reusable abrasive particles so they will fall into the main hopper 70. The debris falls into the debris channel 102.

Figure 6:
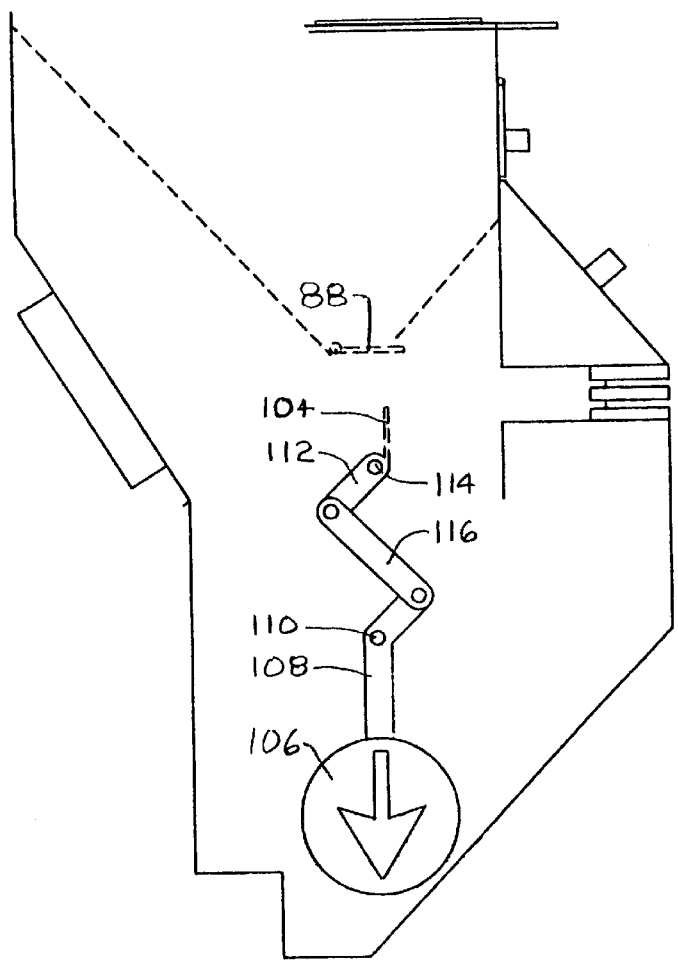
FIG. 6 is a schematic view showing a mechanism for automatically repositioning the diverter.

A suitable mechanism for moving the diverter 104 is shown in FIG. 6. It includes a weight 106 on a bellcrank 108 which is pivotally mounted to the blast head at 110. The diverter 104 and its operating lever 112 are fixed to a pivoted shaft 114. A connector link 116 has its opposite ends connected to the lever 112 and the bellcrank 108. With this mechanism, the diverter 104 will automatically swing to the left when the blast head is tilted leftward, thus intercepting the falling reusable abrasive particles and diverting them into the main hopper 70.

As shown in FIG. 4, the axis of the blast wheel 12 is inclined and it is coincident with the axis of the blast wheel motor 24 which is also inclined. The position of these axes is identified by the line C in FIG. 4. The motor 24 is an hydraulic motor which is advantageous because it is smaller than conventional electric motors and it does not require an external electrical connection. The hydraulic motor has a shaft which has a small diameter, thus causing concerns as to the adequacy of its strength in this environment. To ensure that the strength is adequate, a known overhung load adapter 118 is used to connect the motor 24 to the blast wheel 12. The rotary axis of the overhung load adapter also lies on the axis C. The overhung load adapter 118 is a heavy-duty bearing block designed to handle radial shaft loads that are greater than those sustainable by the drive motor shaft. It absorbs radial and moment loads exerted against the blast wheel during the operation of the apparatus. Overhung load adapters are available from the Helland Company of Plymouth, Minn.

Figure 8:
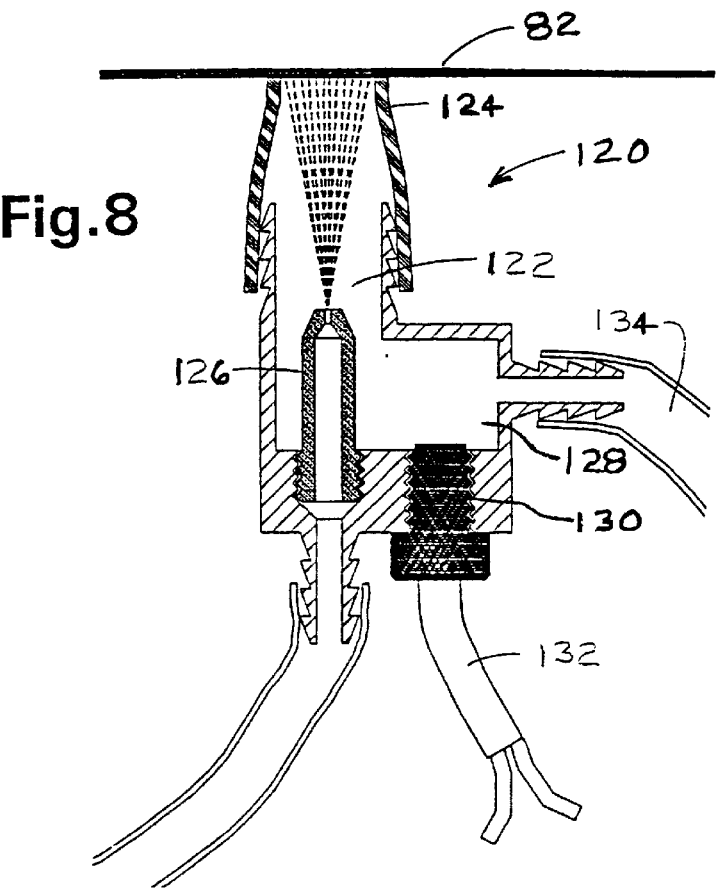
FIG. 8 is a sectional view showing the details of the sampling device used in the preferred embodiment of the invention.

The efficacy of blasting and the suitability of a hull surface for subsequent treatment such as painting has been determined in the past by determining the quantity of chloride ions which remain on the surface after blasting. According to one feature of this invention, the testing of the properties of the blasted surface is performed immediately after blasting by utilizing the sampling device 120 shown in FIG. 8. This sampling device is mounted on the blast head as shown in FIGS. 1–3. It has a chamber 122 which communicates with a sampling opening surrounded by a tubular seal 124, the upper end of which engages the hull 82. Within the device, there is a nozzle 126 which directs a liquid stream against the hull in the area surrounded by the seal. High pressure such as 1000 psi is preferred, but lower pressures may be effective. After the liquid strikes the hull surface, it returns to a lower zone 128 of the chamber where a sensor 130 is located. The sensor may be a conductivity meter, an ion specific electrode, or other devices. Signals of the test results are transmitted by an electrical conductor 132. Spent test liquid is then released from the chamber via an outlet 134 for disposal or for further testing.

The sampling device 120 is preferably mounted on the blast head, behind the trailing edge of the blast opening, so that sampling will occur soon after an area has been blasted. The device 120 is near to and inside of a lateral edge of the blasted strip. When the next strip is blasted with a slight overlap of the previously blasted strip, any corrosion produced by the sampling liquid during the previous pass will be removed by blasting. Also to reduce corrosion, the sampled area is dried by a stream of hot air immediately after sampling has occurred. This hot air may be supplied by a conduit which leads from the air cooled diesel engine to an outlet end 136 (FIGS. 1–3) which is on or near the blast head.

The operation of the apparatus of the invention will be understood from the foregoing description of its structure. A ship is floated into the drydock, and water is removed from the drydock so that the ship is resting on blocks. The blasting vehicle 6 is positioned on the drydock floor and is maneuvered by the operator by controlling the flow of hydraulic fluid to the rotary motors associated with the vehicle wheels. The operator can start anywhere on the hull bottom, but, for purposes of this example, it will be assumed that the hull is being blasted in athwartship bands. The operator positions the vehicle at one side of the hull and actuates the hydraulic cylinders 8 to raise the boom 36 until the blast opening 10 is immediately adjacent to the hull surface. The blast head 2 and vehicle are able to move very close to the hull-supporting blocks by virtue of the positioning of the blast head at the lateral edge of the vehicle. The blast wheel motor 24 is activated to commence the blasting action and, while continuing this action, the vehicle 6 is driven across the width of the drydock to blast an elongated strip of the hull's bottom surface. Throughout this travel, the hydraulic cylinders 8 exert a constant upward force on the boom 36, and this constant force is consequently delivered to the blast head 2 and also against the hull.

The blast wheel 12 impels blasting material through the abrasive delivery channel 78 and through the opening 10 against the hull, and the rebounding particles of abrasive material are received in the abrasive capture channel. The falling stream 90 of abrasive material is subjected to the transverse air flow 92 so that heavier particles fall into the main hopper 70 and lighter particles of abrasive or debris are diverted by the air stream into the debris channel 102. Whenever the blast head 2 inclines, as when moving from the curved outboard regions of the ship's bottom toward the more horizontal center regions, the diverter 104 is automatically inclined so as to compensate for the changes in the inclination of the blast head.

As the blast head 2 travels along the hull surface, the sampling device 120 is operating to direct liquid against the hull and to receive and analyze the liquid to determine if there is an undesirably high level of chloride ion content on the hull surface.

From the foregoing description, persons familiar with the art will recognize that this invention provides an improvement in apparatus for abrasive blasting of a ship bottom. It will be recognized that the invention may be carried out by many different types of apparatus which are not identical to the disclosed embodiment. Accordingly, it is emphasized that the invention is not limited to the disclosed structure but is embracing of a variety of other structures which fall within the spirit of the following claims.

We claim:

1. Apparatus for abrasive blasting the bottom of a hull of a ship in a drydock, comprising, a vehicle which is movable on a drydock;

a support assembly mounted on the vehicle for supporting a blast head on the vehicle;

a blast head mounted on and supported by the support assembly, said blast head having a blast wheel for impelling particles of abrasive particles against the hull of a ship, said blast head having a blast opening through which said particles are delivered from the blast wheel against the hull and through which said particles are rebounded from the hull into the blast head, said blast head being movable to a position where its blast opening faces upwardly and lies in a horizontal plane;

said support assembly including pivots which permit the blast head to pivot freely about two pivot axes which are not parallel to each other, said blast head being free to tilt about said two pivot axes to a position where the blast opening is parallel to an area of the hull which it faces;

an actuator for moving the blast head from an inactive position where it is spaced from the hull to an active position where it contacts the hull, said actuator being operable to exert a constant force on the blast head in the direction of the blast opening when the blast head is at its active position;

said blast head opening facing upwardly due to gravitational force when the blast head is not in its active position;

said blast head having an abrasive delivery channel which leads from the blast wheel to the blast opening, an abrasive capture channel for receiving blasting material which has rebounded from the hull, a main hopper for holding a supply of blasting material which is supplied to the blasting wheel, said abrasive capture channel having an outlet which gravitationally releases a falling stream of blasting material into the main hopper, a debris channel, said falling stream of blasting material being subjected to a transverse stream of air which laterally deflects lighter particles from the stream of blasting material into said debris channel, and a diverter which has an exposed edge which is adjacent to the falling stream of blasting material which has been subjected to said transverse stream of air and defines a boundary between a path leading to the main hopper and a path leading to the debris channel, said apparatus having means for moving the exposed edge of the diverter relative to the blast head in response to chances in the inclination of the blast head, to compensate for changes which occur in the path of the falling stream relative to the blast head when the inclination of the blast head is chanced.

2. Apparatus according to claim 1 wherein the support assembly includes a vertically swingable boom which has a first end mounted on the vehicle and a second end connected to the blast head, said boom having a longitudinal axis which is coincident with one of said pivot axes of the support assembly.

3. Apparatus according to claim 1 wherein the actuator is an hydraulic cylinder, an hydraulic pump, an hydraulic conduit having an inlet connected to the hydraulic pump and an outlet connected to the hydraulic cylinder, a valve in said hydraulic conduit for releasing hydraulic fluid from said hydraulic conduit to maintain said hydraulic cylinder at a constant hydraulic pressure, whereby the hydraulic cylinder exerts a constant force when the blast head is at its active position.

4. Apparatus according to claim 3 wherein the actuator is a double acting hydraulic cylinder which utilizes hydraulic fluid to raise the boom and to lower the boom.

5. Apparatus according to claim 3 wherein the cylinder is inclined no more than 30° from vertical throughout its full range of extension.

6. Apparatus according to claim 1 wherein the vehicle has a vehicle side edge which is movable into proximity with obstacles such as hull-supporting blocks on a drydock floor, and the blast head has a blast head side edge which extends laterally with respect to the vehicle at least to a vertical plane which includes the vehicle side edge.

7. Apparatus according to claim 1 wherein the blast wheel has an inclined axis, a blast wheel motor which lies below the blast wheel and has an axis which is concentric with said inclined axis of the blast wheel, said blast wheel motor being an hydraulic motor, and an overhung load adapter which connects the blast wheel motor to the blast wheel and absorbs radial loads exerted on the blast wheel during operation of the apparatus.

8. Apparatus according to claim 1, said blast head having a chemical sampling device for use in the analysis of soluble materials on the hull, said sampling device having a chamber which has a sampling opening surrounded by a seal which engages the hull, said sampling device having a nozzle for directing a liquid stream against the hull in an area surrounded by the seal, said chamber having an outlet for releasing, from said chamber, outlet liquid which has struck the hull, and means for analyzing liquid which has struck the hull to determine chemical characteristics of soluble materials on the hull.

9. Apparatus for abrasive blasting the bottom of a hull of a ship in a drydock, comprising, a vehicle which is movable on a drydock;

a support assembly mounted on the vehicle for supporting a blast head on the vehicle;

a blast head mounted on and supported by the support assembly, said blast head having a blast wheel for impelling particles of abrasive particles against the hull of a ship, said blast head having a blast opening through which said particles are delivered from the blast wheel against the hull and through which said particles are rebounded from the hull into the blast head;

an actuator for moving the blast head from an inactive position where it is spaced from the hull to an active position where it contacts the hull;

said blast head having an abrasive delivery channel which leads from the blast wheel to the blast opening, an abrasive capture channel for receiving blasting material which has rebounded from the hull, a main hopper for holding a supply of blasting material which is supplied to the blasting wheel, said abrasive capture channel having an outlet which gravitationally releases a falling stream of blasting material into the main hopper, a debris channel, said falling stream of blasting material being subjected to a transverse stream of air which laterally deflects lighter particles from the stream of blasting material into said debris channel, and a diverter which has an exposed edge which is adjacent to the falling stream of blasting material which has been subjected to said transverse stream of air and defines a boundary between a path leading to the main hopper and a path leading to the debris channel, said apparatus having means for moving the exposed edge of the diverter relative to the blast head in response to changes in the inclination of the blast head, to compensate for changes which occur in the path of the falling stream relative to the blast head when the inclination of the blast head is changed.

10. Apparatus for abrasive blasting the bottom of a hull of a ship in a drydock, comprising, a vehicle which is movable on a drydock;

a support assembly mounted on the vehicle for supporting a blast head on the vehicle;

a blast head mounted on and supported by the support assembly, said blast head having a blast wheel for impelling particles of abrasive particles against the hull of a ship, said blast head having a blast opening through which said particles are delivered from the blast wheel against the hull and through which said particles are rebounded from the hull into the blast head;

an actuator for moving the blast head from an inactive position where it is spaced from the hull to an active position where it contacts the hull;

said blast head having a chemical sampling device for use in the analysis of soluble materials on the hull, said sampling device having a chamber which has a sampling opening surrounded by a seal which engages the hull, said sampling device having a nozzle for directing a liquid stream against the hull in an area surrounded by the seal, said chamber having an outlet for releasing, from said chamber, outlet liquid which has struck the hull, and means for analyzing liquid which has struck the hull to determine chemical characteristics of soluble materials on the hull.

11. A chemical sampling device for testing soluble chemicals on the hull of a ship, comprising, a body having a chamber provided with a sampling opening surrounded by a seal which engages the hull, said sampling device having a nozzle for directing a liquid stream against the hull in an area surrounded by the seal, said chamber having an outlet for releasing, from said chamber, outlet liquid which has struck the hull, and means for analyzing liquid which has struck the hull to determine chemical characteristics of soluble materials on the hull.

12. A method of testing soluble chemicals on the hull of a ship using a device which has a chamber provided with a sampling opening surrounded by a seal, comprising the steps of:

placing said seal against the hull to surround a sampling area on the hull, directing a stream of sampling liquid against the hull in said sampling area, receiving in said chamber said sampling liquid which has struck the hull, and analyzing the sampling liquid which struck the hull to determine chemical characteristics of soluble materials on the hull.

13. Apparatus for abrasive blasting the bottom of a hull of a ship in a drydock, comprising, a vehicle which is movable on a drydock;

a support assembly mounted on the vehicle for supporting a blast head on the vehicle;

a blast head mounted on and supported by the support assembly, said blast head having a blast wheel for impelling particles of abrasive particles against the hull of a ship, said blast head having a blast opening through which said particles are delivered from the blast wheel against the hull and through which said particles are rebounded from the hull into the blast head, said blast head being movable to a position where its blast opening faces upwardly and lies in a horizontal plane;

said support assembly including pivots which permit the blast head to pivot freely about two pivot axes which are not parallel to each other, said blast head being free to tilt about said two pivot axes to a position where the blast opening is parallel to an area of the hull which it faces;

an actuator for moving the blast head from an inactive position where it is spaced from the hull to an active position where it contacts the hull, said actuator being operable to exert a constant force on the blast head in the direction of the blast opening when the blast head is at its active position;

said blast head opening facing upwardly due to gravitational force when the blast head is not in its active position;

said blast head having a chemical sampling device for use in the analysis of soluble materials on the hull, said sampling device having a chamber which has a sampling opening surrounded by a seal which engages the hull, said sampling device having a nozzle for directing a liquid stream against the hull in an area surrounded by the seal, said chamber having an outlet for releasing, from said chamber, outlet liquid which has struck the hull, and means for analyzing liquid which has struck the hull to determine chemical characteristics of soluble materials on the hull.

14. Apparatus according to claim 13 wherein the support assembly includes a vertically swingable boom which has a first end mounted on the vehicle and a second end connected to the blast head, said boom having a longitudinal axis which is coincident with one of said pivot axes of the support assembly.

15. Apparatus according to claim 13 wherein the actuator is an hydraulic cylinder, an hydraulic pump, an hydraulic conduit having an inlet connected to the hydraulic pump and an outlet connected to the hydraulic cylinder, a valve in said hydraulic conduit for releasing hydraulic fluid from said hydraulic conduit to maintain said hydraulic cylinder at a constant hydraulic pressure, whereby the hydraulic cylinder exerts a constant force when the blast head is at its active position.

16. Apparatus according to claim 15 wherein the actuator is a double acting hydraulic cylinder which utilizes hydraulic fluid to raise the boom and to lower the boom.

17. Apparatus according to claim 15 wherein the cylinder is inclined no more than 30° from vertical throughout its full range of extension.

18. Apparatus according to claim 13 wherein the vehicle has a vehicle side edge which is movable into proximity with obstacles such as hull-supporting blocks on a drydock floor, and the blast head has a blast head side edge which extends laterally with respect to the vehicle at least to a vertical plane which includes the vehicle side edge.

19. Apparatus according to claim 13 wherein the blast wheel has an inclined axis, a blast wheel motor which lies below the blast wheel and has an axis which is concentric with said inclined axis of the blast wheel, said blast wheel motor being an hydraulic motor, and an overhung load adapter which connects the blast wheel motor to the blast wheel and absorbs radial loads exerted on the blast wheel during operation of the apparatus.

* * * * *